United States Patent
Rodriguez Gonzalez et al.

(10) Patent No.: US 11,996,801 B2
(45) Date of Patent: May 28, 2024

(54) SOLAR TRACKER

(71) Applicants: NIASA NEFF Y ASOCIADOS, S.A., Lasarte-Oria (ES); NCLAVE RENEWABLE, S.L., Madrid (ES)

(72) Inventors: Jose Miguel Rodriguez Gonzalez, Lasarte-Oria (ES); Diego Lopez Zozaya, Cizur Menor (ES); Jose Ignacio Lopez Ayarza, Logrono (ES); Juan Manuel Gomez Garcia, Logrono (ES)

(73) Assignees: NIASA NEFF Y ASOCIADOS, S.A., Lasarte-Oria (ES); NCLAVE RENEWABLE, S.L., Madrid (ES)

( * ) Notice: Subject to any disclaimer, the term of this patent is extended or adjusted under 35 U.S.C. 154(b) by 37 days.

(21) Appl. No.: 17/922,935

(22) PCT Filed: Apr. 27, 2021

(86) PCT No.: PCT/ES2021/070283
§ 371 (c)(1),
(2) Date: Nov. 2, 2022

(87) PCT Pub. No.: WO2021/224521
PCT Pub. Date: Nov. 11, 2021

(65) Prior Publication Data
US 2023/0223891 A1   Jul. 13, 2023

(30) Foreign Application Priority Data
May 5, 2020   (ES) .............................. ES202030805U

(51) Int. Cl.
*H02S 20/32*   (2014.01)
*F24S 30/425*  (2018.01)
*F24S 30/00*   (2018.01)

(52) U.S. Cl.
CPC ............ *H02S 20/32* (2014.12); *F24S 30/425* (2018.05); *F24S 2030/11* (2018.05)

(58) Field of Classification Search
CPC ...... H02S 20/32; F24S 30/425; F24S 2030/11
See application file for complete search history.

(56) References Cited

U.S. PATENT DOCUMENTS

| | | | |
|---|---|---|---|
| 2013/0240018 A1* | 9/2013 | Park | H01L 31/052 136/246 |
| 2016/0013751 A1* | 1/2016 | Michotte De Welle | F24S 30/425 136/246 |
| 2018/0091088 A1* | 3/2018 | Barton | F24S 30/425 |

FOREIGN PATENT DOCUMENTS

| | | |
|---|---|---|
| DE | 3316731 A1 | 11/1984 |
| WO | 2015135019 A1 | 9/2015 |

(Continued)

OTHER PUBLICATIONS

International Search Report for corresponding PCT application No. PCT/ES2021/070283, dated Aug. 2, 2021.

*Primary Examiner* — Jayne L Mershon
(74) *Attorney, Agent, or Firm* — Notaro, Michalos & Zaccaria P.C.

(57) ABSTRACT

A plurality of posts and actuator posts connected to a foundation and to a torque tube on which solar panels are duly mounted is disclosed. The actuator posts include a hinge next to a radial arm that is disposed solidly connected to the torque tube, the arm being hinged at the other end to a linear actuator with screw drive, the bottom end is connected to the actuator post by a joint. Each linear actuator is actuated by a gear that engages with an endless screw solidly connected to a Cardan-type drive shared by all the actuators and is actuated by an electric motor, the Cardan-type drive fitting closely to the torque tube by supports.

5 Claims, 5 Drawing Sheets

(56) References Cited

FOREIGN PATENT DOCUMENTS

| | | |
|---|---|---|
| WO | 2019043612 A1 | 3/2019 |
| WO | 2019183492 A1 | 9/2019 |

\* cited by examiner

SOLAR TRACKER

TECHNICAL FIELD

The present invention relates to a solar tracker and its actuation, of the type intended to support photovoltaic solar panels, with a rotation shaft and a single row per actuation or actuations, with a great length and/or surface area of panels. The invention greatly reduces or mitigates the lack of dynamic stability of this type of tracker against the action of the wind and the consequent possible damage caused by phenomena such as "flutter" and "gallop", which can damage the panels and even cause the collapse of the entire structure.

The object of the invention is to provide a simple, reliable, robust, easy to assemble and economical solar tracker and actuation, which minimises or eliminates the generation of shadows, both on the upper and lower face of the panels, said latter aspect to be especially taken into account in bifacial photovoltaic panels. And, simultaneously with all of the above, with a minimum generation of vibrations on the panels, since the system invented is not suspended either from the panels themselves or from the metallic structure (profiles called straps) to which they are attached. Subjecting the panels to stresses and/or vibrations, however small, can cause considerable damage to the panels, to the point of forcing them to be replaced, or reducing their performance or shortening their useful life.

BACKGROUND OF THE INVENTION

Single-row photovoltaic solar tracker are known wherein the photovoltaic panels are disposed on respective straps, transversal to a long torque shaft, supported by a plurality of posts, intended to reduce the lack of dynamic stability of their cantilevers against the action of the wind and the consequent possible damage that this may cause.

In such sense the invention patent WO 2019183492 can be cited, which describes a solar tracking system involving a support structure rotatable with respect to a plurality of bases, wherein said structure includes longitudinal beams and a plurality of pairs of transversal beams, the transversal beams being oriented orthogonal to the longitudinal beam, having a plurality of gearboxes solidly connected to the pairs of transversal beams, and connected to an actuation shaft which extends through the support structure parallel to one of the longitudinal beams, gearboxes being used for actuating linear actuators, which are coupled at one end to one of the bases and at the other end to the same gearboxes, so that when driven by the drive shaft they extend or retract, causing the support structure to rotate about a rotation shaft.

Although this structure fulfils the function for which it was designed, it presents a complex and varied set of problems, among which the following aspects should be highlighted:

The mechanical drive between the actuators takes place by means of a drive shaft directly supported on the straps on which the solar panels are supported, at off-centre points with respect to the rotation shaft of the tracker, which causes the stresses and vibrations of the shaft, caused respectively by its own weight and rotation, in addition to the effects produced by the action of the wind on the shaft, all circumstances that can cause cracking of the solar panels, to be driven thereto.

The complex structuring of this type of trackers, involving multiple prominent elements in different areas under the panels, causes them to generate greater shadows, reducing the generation of energy by the reflection of sunlight on the ground/soil of the solar plant. Also noteworthy are the shadows on the solar panels produced by the same drive shaft.

They use bevel gearboxes, with high mechanical reversibility, which makes it necessary to use motorised actuation systems with brakes or other elements that prevent said reversibility. Furthermore, due to the very nature of this type of gears, their reduction rates are low, which implies that the torque to be driven by the drive shaft must be high, requiring considerable dimensions and weight, with the consequent high cost in material, transport and installation.

The tracker is complex to assemble, since its actuation system is connected to the straps that support the panels, which means that it can only be installed once the straps are in place.

DESCRIPTION OF THE INVENTION

The solar tracker recommended herein solves the aforementioned problems in a fully satisfactory manner, in each and every one of the aspects mentioned above.

For this purpose, a tracker has been designed wherein the actuation means of the tracker are not directly connected to the means for supporting and attaching the photovoltaic solar panels, which eliminates the driving of stresses and/or vibrations to said panels and greatly facilitates the assembly of the tracker, as well as a series of additional advantages that will be described throughout the present specification.

More specifically, the tracker of the invention is formed from a plurality of vertical posts connected to the corresponding foundation or support base in question, posts aligned in parallel, and on which rests, by means of bearings or bushings, a torque tube, on which the corresponding means for supporting and attaching the photovoltaic solar panels will be assembled, wherein said means for supporting and attaching the panels will be conventional means, such as straps, rectangular frames, omega- or U-shaped profiles or any other means that suitably adapts to the features of the panels to be installed in the solar tracker.

To control the inclination of the assembly, it has been provided that for a plurality of the posts, which we will call actuator posts to differentiate them from the rest of the posts, in correspondence with the hinge (bearings or bushings) that is established at the upper end of each actuator post, a radial arm is disposed solidly attached to said torque tube.

Each radial arm is hinged at the other end to a linear actuator with screw drive, the bottom end of which is also hingedly connected to the aforementioned actuator post.

Consequently, the actuation of the linear actuator will cause the angular movement of the radial arm, and as said arm is solidly connected to the torque tube, the angular movement of the same and consequently of the whole set of panels associated thereto.

For this purpose, it has been provided that each linear actuator will be actuated from a gear-endless screw assembly, wherein the endless screw will be associated with a drive, formed by Cardan-type joints and drive shafts (telescopic in the diagonal sections closest to the actuators), so that said drive will be driven by one or more electric motors, so that in the event that more than one motor is involved, they will be electronically synchronised.

The electric motor or motors may rotate in one direction or the other, depending on the angular movement to be given to the structure carrying the solar panels. It has been provided that said structure will be disposed such that it can be oriented from east to west, as well as return to its initial position at the end of the day by reversing the rotation of said motors, being able to offer a range of orientation usually of ±55-60 degrees, these values being able to be exceeded if the design of the tracker so requires.

In this way, the described drive enables multiple linear actuators to be simultaneously actuated, with the particularity that, although the application point of said linear actuators is separated from the torque tube, the drive system between actuators runs in practice along its entire length, fitted closely and parallel to the torque tube in the sections between actuator posts, eliminating the generation of shadows, oblique sections being defined in the vicinity of the area for implementing the linear actuators, wherein the drive shaft will be telescopic to absorb the difference in distances between the drive section carrying the endless screw and the section that runs fitted closely and parallel to the torque tube, depending on the different extension and contraction positions of the actuators.

Starting from this structuring, the following advantages are obtained:

- The mechanical drive between the linear actuators occurs by means of a drive shaft supported at several points along the torque tube of the tracker, and which at no point is directly connected to the solar panels, thus avoiding the drive of stresses and vibrations thereto.
- As the drive shaft is fitted closely to the torque tube of the tracker in the sections between actuator posts, the generation of shadows under the bifacial solar panels which normally do not cover the area of the torque tube, in which the drive shaft is located in the present invention, is considerably reduced, if not totally eliminated, precisely to avoid the shadow of the aforementioned torque tube.
- The supports of the drive shaft are attached to a much more rigid element than the straps used to implement the solar panels, which allows a smaller dimensioning of the shaft, as it is more solidly supported and therefore less susceptible to flexing/vibrating due to the action of the wind, from which it is further protected by the shielding of the same torque tube of the tracker.
- The use of endless screw-gear type drives, with a high reduction ratio, causes them to be practically irreversible mechanically, which makes it possible to use screws with a higher degree of reversibility/efficiency in linear actuators, also allowing the use of motors without brakes, for simplicity and cost. At the same time, this high reduction makes it possible to reduce the torque required to be driven between actuators by means of the drive shafts, thus making it possible to lighten and consequently reduce the cost of the drive shaft between actuator gearboxes.
- The described solution allows the complete installation of the actuation system of the solar tracker, without the need to mount the means for supporting and attaching the panels. This is an advantage when installing the tracker, since the drive system is positioned without the straps interfering therein just as it does not interfere with the subsequent assembly of the panels. In addition, the actuation is operational from an early stage of the overall assembly, so that the torque tube can be oriented using a motor to facilitate the rest of the assembly process.

BRIEF DESCRIPTION OF THE DRAWINGS

As a complement to the description that will be provided herein, and for the purpose of helping to make the features of the invention more readily understandable, according to a preferred practical exemplary embodiment thereof, said description is accompanied by a set of drawings constituting an integral part thereof in which, by way of illustration and not limitation, the following is represented.

Finally.

PREFERRED EMBODIMENT OF THE INVENTION

Figure 1:
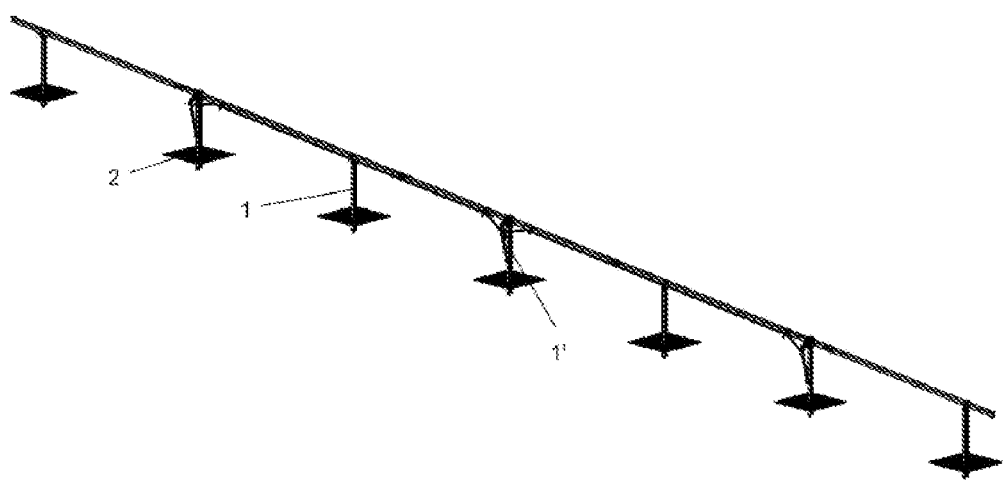
FIG. 1 shows a partial perspective view of a solar tracker made in accordance with the present invention, without its solar panels, as well as the means for supporting and attaching the same to the torque tube of the tracker.

In view of the figures shown above, it can be seen how the solar tracker of the invention is formed from a plurality of vertical posts (1) and actuator posts (1') connected to the corresponding foundation (2) or support base in question, posts that are aligned in parallel, and on which rests, by means of hinges (3), such as bearings or bushings, a torque tube (4), on which the means for supporting and attaching the photovoltaic solar panels will be assembled.

Each post (1) and actuator post (1') shall be provided with a single hinge (3) or a set of hinges, depending on the degree of exposure to the wind.

Laterally to the single hinge (3), or between each group of hinges (3), of each actuator post (1') a radial arm (5) is disposed solidly connected to the torque tube (4), the arm being hinged at the other end to a linear actuator (6) with linear screw drive, the bottom end (7) of which is connected to the actuator post (1') by means of a joint (8).

In this way, the actuation of the actuator will cause the angular movement of the radial arm (5), and consequently of the entire set of solar panels.

Figure 2:
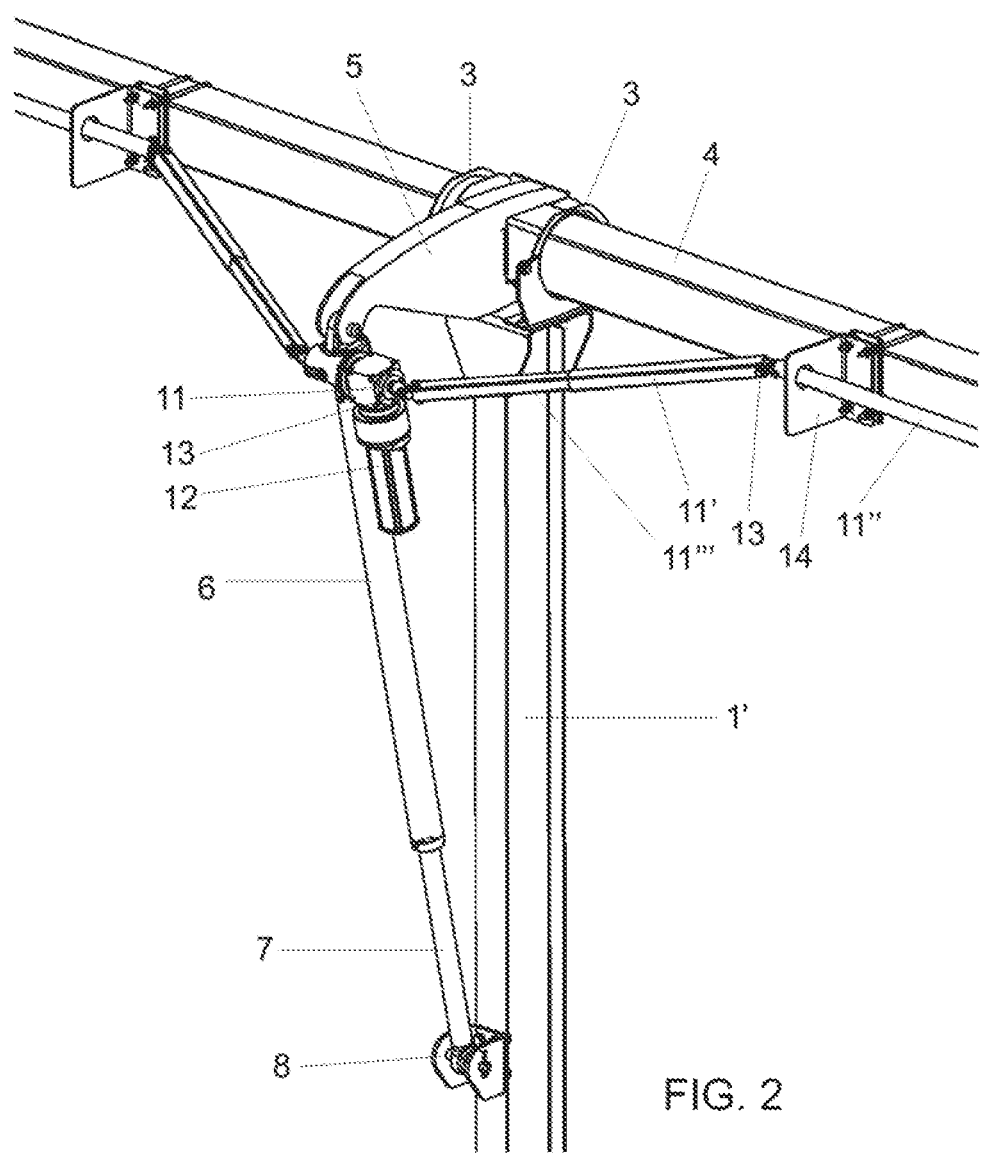
FIG. 2 shows a detailed perspective view of the tracker at the level of the regulation means for regulating the inclination thereof according to a preferred practical embodiment of the invention.
Figure 3:
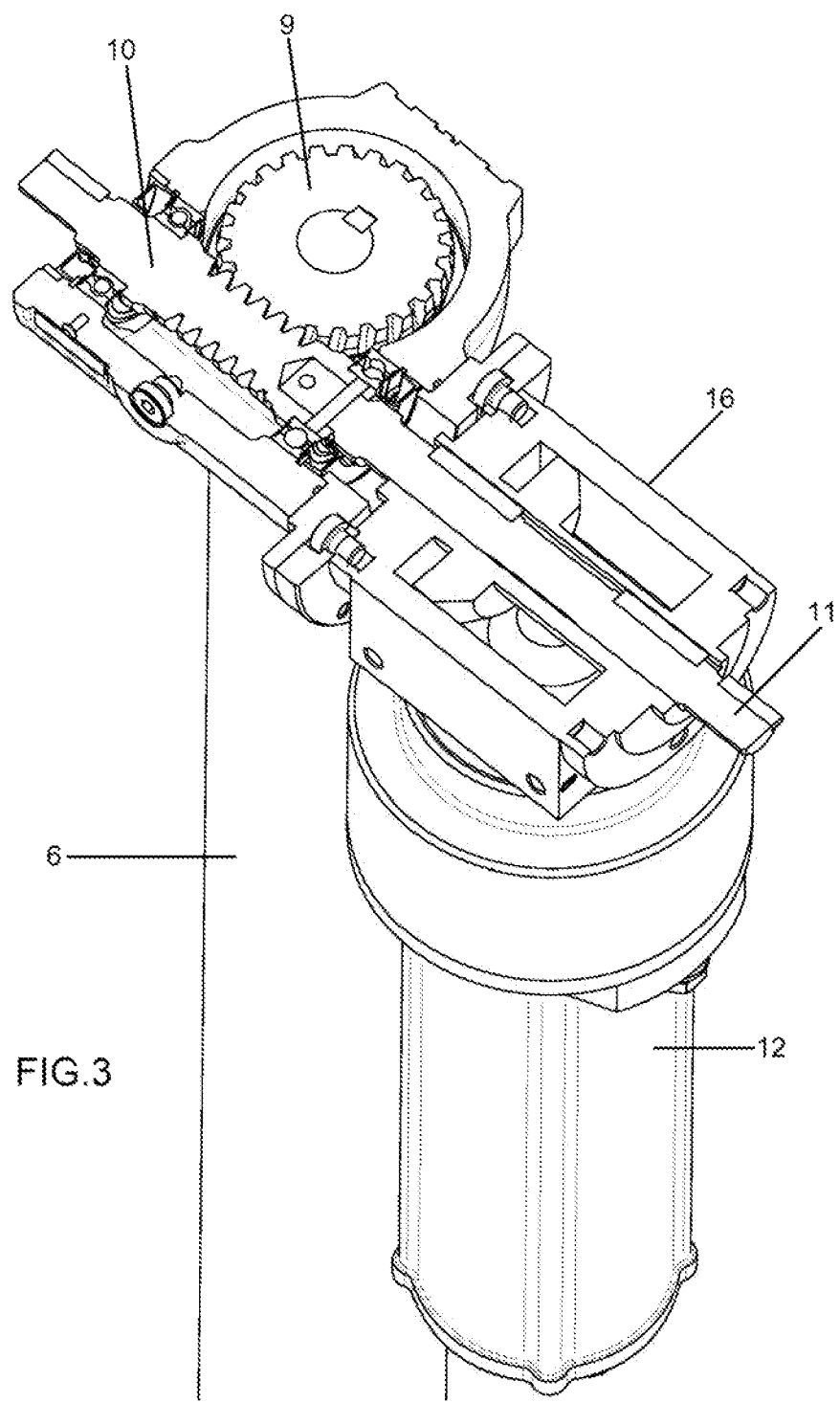
FIG. 3 shows a detailed perspective and cross-sectional view of the mechanism at the level of the endless screw-gear assembly that controls the actuation of the actuators by means of the corresponding electric motor.
Figure 4:
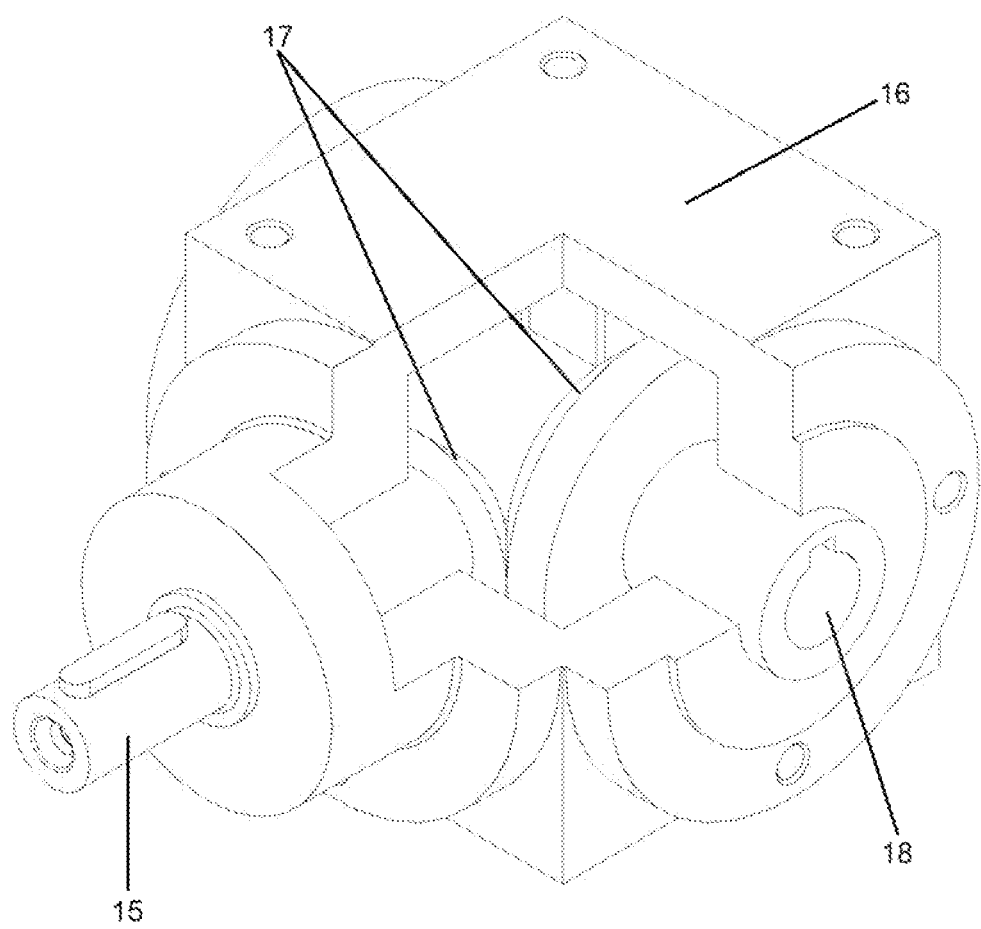
FIG. 4 shows a detailed perspective and partially cross-sectional view of the gearbox associated to the electric motor acting on the endless screw of the previous figure.

According to FIGS. 2 to 4, the screw of each linear actuator (6) is actuated by a gear (9) that engages with an endless screw (10) solidly connected to a Cardan-type drive (11-11'-11''-11''') shared by all the linear actuators, which is actuated by at least one electric motor (12), by means of a gearbox (16).

As can be seen in FIG. 2, the very configuration of the Cardan-type drive means that, since the application point of said linear actuators is separated at a distance from the torque tube (4), said drive by means of its hinges (13) can be made to run fitted closely and parallel to the torque tube (4) in the sections between actuator posts (1') connected thereto by means of respective supports (14).

Moreover, and as can be seen in FIG. 2, in order to adapt to the different positions that the linear actuator can adopt due to its own actuation, the oblique sections (11') of the drive will have a telescopic nature, a hollow tubular section being defined, in this case of square cross section but that can be of any other cross section, which correspond to the same reference (11') and a movable section (11''') inside the same section, being able to include limitation means for limiting its telescopic path.

The Cardan-type drive allows multiple linear actuators to be simultaneously actuated by a single motor.

Said electric motor (12) will preferably be disposed in correspondence with one of the central linear actuators (6), so that its gearbox (16) is connected in series with the Cardan-type drive (11-11'-11''-11''') the shaft (11) defining a double output shaft which crosses the gearbox (16) through the hole (18) and is actuated by the drive shaft (15) of the electric motor (12) by means of a reduction gear based on bevel gears (17), any other conventional drive system not being ruled out.

Figure 5:
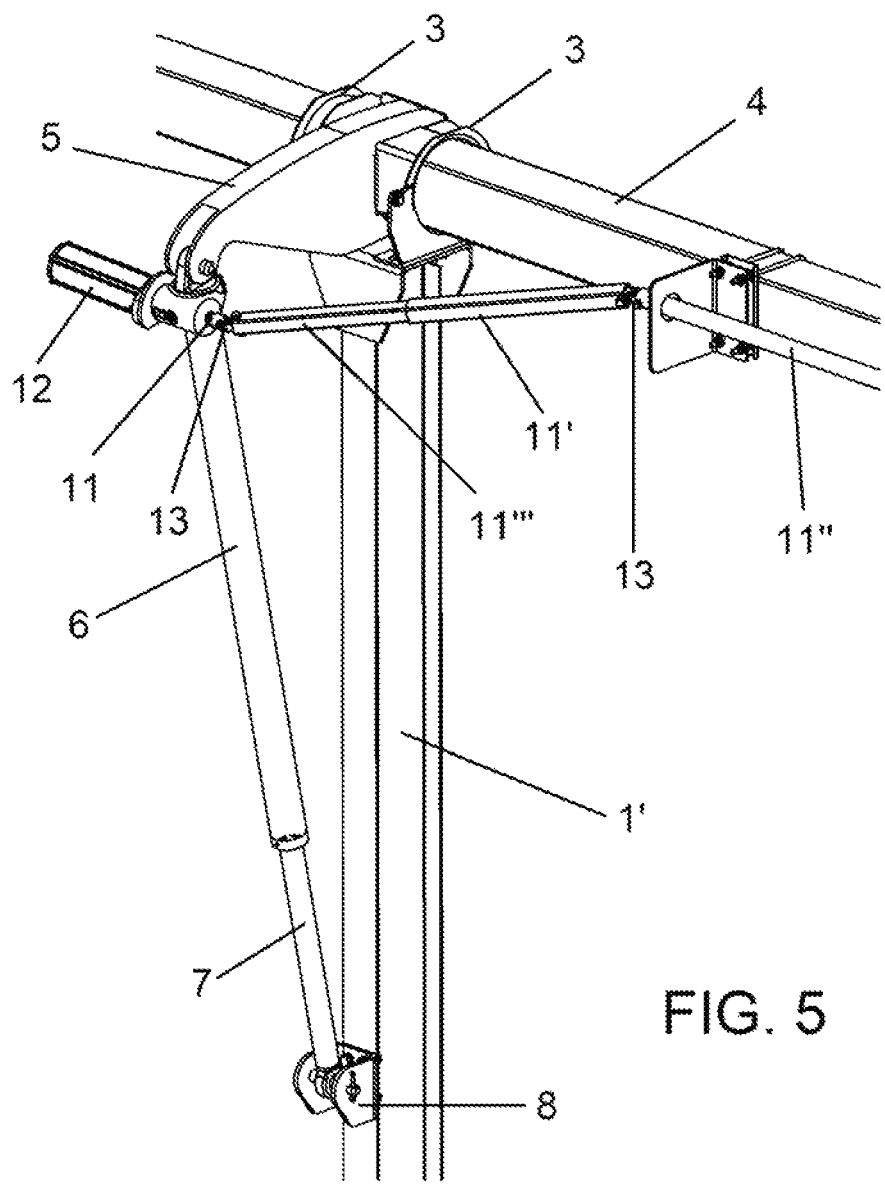
FIG. 5 shows a detailed perspective view of the tracker at the level of the regulation means for regulating the inclination thereof according to a second variant embodiment of the invention.

This disposition reduces the torque to be driven between the linear actuators by means of the drive shafts. Optionally, the electric motor could also be installed in correspondence with the linear actuator of one of the end actuator posts (1'). In this particular embodiment, the gearbox (16) can be dispensed with by disposing the motor parallel to the torque tube as shown in FIG. 5.

Optionally also another particular embodiment has been foreseen wherein the electric motor (12) has a double output shaft, in this case disposed parallel to the torque tube (4) in correspondence with one of the central linear actuators (6), and wherein the double output shaft of the electric motor (12) corresponds to the shaft (11) of the Cardan-type drive (11-11'-11''-11'''). This particular embodiment makes it possible to dispense with the gearbox (16) of the preferred embodiment while maintaining the same torque requirement to be driven by means of the drive shaft, although increasing the cost of the motor to be installed.

However, if the installation is very large and heavy, the participation of more than one asynchronous electric motor is not ruled out, said motors being duly synchronised in their activation, by mechanical means such as those set forth in this invention and/or electronic means.

The invention claimed is:

1. A solar follower, formed from a plurality of posts (1) and actuator posts (1') connected to the corresponding foundation (2) or support base in question, posts aligned in parallel, and on which rests, by means of at least one hinge (3) per post, a torque tube (4), on which the means for supporting and attaching the solar panels are assembled, characterised in that in correspondence with each actuator post (1'), next to its hinge (3) a radial arm (5) is disposed solidly connected to the torque tube (4), the arm being hinged at the other end to a linear actuator (6) with screw drive, the bottom end (7) of which is also connected to the actuator post (1') by means of a joint (8), each linear actuator (6) being actuated by a gear (9) that engages with an endless screw (10) solidly connected to a Cardan-type drive (11-11'-11''-11''') shared by all the actuators and which is actuated by an electric motor (12), with the particularity that the sections (11'') of the Cardan-type drive that are defined between the linear actuators (6) are fitted closely to the torque tube (4) by means of supports (14).

2. The solar follower, according to claim 1, characterised in that the sections (11') of the Cardan-type drive that adopt an oblique disposition between the torque tube (4) and the endless screw (10) for actuating each actuator have a telescopic configuration.

3. The solar follower, according to claim 1, characterised in that the electric motor (12) is disposed on the central linear actuator of the assembly, in series with the Cardan-type drive (11-11'-11''-11'''), by means of a gearbox (16).

4. The solar follower, according to claim 1, characterised in that the electric motor (12) has a double output shaft which is disposed parallel to the torque tube (4) in correspondence with one of the central linear actuators (6), with the particularity that the double output shaft of the electric motor (12) corresponds to the shaft (11) of the Cardan-type drive (11-11'-11''-11''').

5. The solar follower, according to claim 1, characterised in that the electric motor (12) is disposed on one of the end linear actuators of the assembly.

* * * * *